United States Patent
Few et al.

[11] Patent Number: 6,035,903
[45] Date of Patent: Mar. 14, 2000

[54] SELF REGULATING AUTOMATIC TRANSMISSION FLUID CHANGER

[75] Inventors: Jeffrey P. Few, Elkhart; Daryl D. Hochstetler, Milford; Roger Burger, Goshen, all of Ind.

[73] Assignee: Flo-Dynamics, Inc., Compton, Calif.

[21] Appl. No.: 09/219,243

[22] Filed: Dec. 22, 1998

[51] Int. Cl.[7] .................................................. B65B 1/04
[52] U.S. Cl. .......................... 141/98; 141/65; 141/198; 184/1.5
[58] Field of Search ................... 141/98, 65, 198, 141/192, 83, 59; 181/1.5

[56] References Cited

U.S. PATENT DOCUMENTS

| | | |
|---|---|---|
| 3,513,941 | 5/1970 | Becnel . |
| 4,602,344 | 7/1986 | Ferretti et al. . |
| 4,938,315 | 7/1990 | Ohta et al. ................................. 184/1.5 |
| 5,273,085 | 12/1993 | Edwards et al. . |
| 5,291,968 | 3/1994 | Brown ..................................... 141/198 |
| 5,361,870 | 11/1994 | Courcy . |
| 5,370,160 | 12/1994 | Parker . |
| 5,427,202 | 6/1995 | Behring et al. . |
| 5,447,184 | 9/1995 | Betancourt . |
| 5,469,749 | 11/1995 | Shimada et al. . |
| 5,472,064 | 12/1995 | Viken . |
| 5,482,062 | 1/1996 | Chen . |
| 5,522,474 | 6/1996 | Burman . |
| 5,524,682 | 6/1996 | Amonson . |
| 5,535,849 | 7/1996 | Few . |
| 5,562,181 | 10/1996 | Elkin et al. . |
| 5,586,583 | 12/1996 | Edwards et al. . |
| 5,606,516 | 2/1997 | Douglas et al. . |
| 5,614,830 | 3/1997 | Dickert et al. . |
| 5,626,170 | 5/1997 | Parker . |
| 5,635,625 | 6/1997 | Tsunoda . |
| 5,685,396 | 11/1997 | Elkin et al. . |
| 5,701,862 | 12/1997 | Inoue et al. . |
| 5,743,357 | 4/1998 | Few . |

*Primary Examiner*—Steven O. Douglas
*Attorney, Agent, or Firm*—Fulwider Patton Lee & Utecht, LLP

[57] ABSTRACT

An automatic transmission fluid changer for connection with a cooling circuit of an automatic transmission, including a used fluid receptacle for collecting fluid pumped from the transmission and a new fluid receptacle for containing new fluid supplied to the transmission. The device monitors the quantity change in the new and used receptacles and regulates the flow of new fluid into the transmission in order to replace the used fluid expelled from the transmission with an equal amount of new fluid.

29 Claims, 8 Drawing Sheets

SELF REGULATING AUTOMATIC TRANSMISSION FLUID CHANGER

BACKGROUND OF THE INVENTION

1. Field of the Invention

The subject invention relates to vehicle maintenance and, more particularly, to an apparatus for withdrawing and replacing transmission fluid in an automatic transmission.

2. Description of the Prior Art

Automatic transmissions require transmission fluid both to operate the driving means within the transmission and to lubricate the internal components within the transmission. Simply draining an automatic transmission and refilling the transmission does not provide adequate exchange of fluid due to the fact that as much as ⅔ of the used transmission fluid can remain trapped in the bell housing of the transmission. Such a procedure can, therefore, only dilute the used transmission fluid with about ⅓ new fluid. Most automatic transmissions employ external cooling systems wherein an internal transmission pump pumps transmission fluid out of the transmission, through a heat exchanger and back to the transmission. By intercepting such an external cooling system, an effective exchange of substantially all of the transmission fluid in a transmission can be accomplished. Several devices have been developed to collect used transmission fluid flowing through a cooling system while replacing such used fluid with new transmission fluid.

Devices for replacing transmission fluid by intercepting the transmission cooling circuit have been known for some time. An example of such a device exchanges transmission fluid by disconnecting a transmission fluid cooling line and using compressed air to force new transmission fluid into the transmission at the same rate at which used fluid is pumped from the transmission by the transmission pump. The rate of new fluid input is controlled by adjusting the pressure of the air applied to the new fluid and the rate at which fluid is expelled is determined by the speed of the transmission pump. While such a system can effectively replace all of the fluid in the transmission, the manual adjustment of air pressure can prove difficult, leading to an over or under filled transmission, potentially damaging the transmission.

Another method which has been employed to exchange transmission fluid involves use of a chamber divided by a piston or bladder, one side of which is filled with new transmission fluid. Used transmission fluid is forced, under pressure of the internal transmission pump, into the chamber on the other side of the piston. The used fluid forced into the chamber forces the new fluid out of the chamber to the transmission. The operating pressure of the transmission must overcome the preloaded pressure of the new fluid in the chamber, which is generally about 30 pounds per square inch (psi). In addition, an excessive pressure, generally over 50 psi, forced into the chamber from the transmission will cause the used fluid to bypass to a reserve reservoir. Therefore, there exists the potential, when using such a device, that the transmission will be filled with an incorrect amount of new fluid.

Other devices have been developed which pump new transmission fluid into the transmission through the transmission cooling circuit while used transmission fluid is removed. The rates of input and output are controlled by manually adjusting valves to match the flow of new transmission fluid with the flow of used transmission fluid. Examples of such a device are disclosed in U.S. Pat. Nos. 5,743,357; 5,535,849; 5,370,160 and 5,626,170, all assigned to the assignee of the present application. While devices of this type have enjoyed considerable commercial success, the fact remains that, for successful operation, some degree of skill is required on behalf of the operator and continuous monitoring is necessary to assure a complete fluid exchange with appropriate filling of the transmission.

In an attempt to automate the fluid exchange process, devices have been developed to monitor the flow rates into and out of the transmission and restrict or increase flow to automatically achieve approximately equal flow rates. While such systems are intended to greatly simplify the procedure for the service technician, such systems typically rely on flow measurement and fail to provide an accurate monitoring of quantity of transmission fluid added to and removed from the transmission as would ideally be desired. The inaccuracy inherent in measuring the flow of transmission fluid is due in large part to the nature of transmission fluid. Fluid viscosity significantly affects the performance of flow meters. The viscosity of transmission fluid is temperature dependant, the rendering traditional flow measurement inaccurate, leading to flow rates which vary with season or time of day or with the operating temperature of the transmission being serviced. Additionally, air bubbles entrained within the transmission fluid will further render such flow measurements inaccurate, due to the fact that traditional flow meters, which cannot distinguish the air bubbles from the transmission fluid, will interpret the volume occupied by the air bubbles as being transmission fluid, causing the flow meter to register a higher than actual flow oftransmission fluid.

Since the nature of the fluid renders conventional flow measurement inherently inaccurate, a method of accurately measuring the actual quantity of fluid exchanged, regardless of the viscosity of the fluid or the amount of air entrained within the fluid, is needed. However, the same problems which plague flow measurement also arise with many methods ofmeasuring volume. For instance, air bubbles seem to increase the overall volume of the fluid thus rendering inaccurate many volume sensors such as floats measuring the volume of transmission fluid removed from the transmission. Also, many devices which measure the height of a fluid can be rendered inaccurate when used on a surface which is not level, as is the case with many shop floors.

Thus there remains a need for a transmission fluid exchange device to automatically replace used transmission fluid expelled from a transmission with an accurate equivalent of new transmission fluid. Such a device would closely monitor the quantity of fluid exchanged, regardless of the viscosity of the fluid or amount of air entrapped therein. It would also be advantageous if the quantities of new and used fluid in the new and used fluid receptacles were sensed before transfer is commenced so it could be determined whether there is sufficient new fluid to complete the transfer and sufficient capacity in the used fluid receptacle. Additionally such a device would desirably employ a measurement method providing data which could easily be electronically processed while avoiding the use of complicated mechanical mechanisms in order to ensure reliability.

SUMMARY OF THE INVENTION

The invention provides a device for changing transmission fluid in an automatic transmission by intercepting the transmission cooling circuit to withdraw used fluid for collection in a used fluid receptacle and introducing new fluid to be pumped into the transmission. The quantity of used fluid received in the used fluid container is monitored by a sensor to sense the total quantity and the rate at which the new fluid is added is controlled to balance the rate at which fluid is expelled from the transmission. By measuring the height of fluid in the used fluid receptacle, the device accurately determines the quantity of fluid removed, unaffected by any change in the viscosity of the fluid or by any air which may be entrapped within the fluid.

The self regulating changer of the present invention may connect into the transmission cooling system of an automatic transmission to utilize the internal transmission pump to pump used fluid from the transmission for storage in a used fluid receptacle. The rising level of fluid in the used fluid receptacle is detected and the data sent to a controller. Simultaneously, new fluid from a new fluid receptacle is pumped at a rate corresponding with the rate of removal from the transmission to replace the used fluid removed. The level of fluid in the new fluid receptacle may likewise be detected and the data sent to a comparator in the controller. In the preferred embodiment, the data indicative of the fluid levels in the new and used fluid receptacles is utilized to calculate the quantity of fluid in each receptacle based upon the known geometry of the respective receptacle.

In the preferred embodiment, when the rate at which fluid being pumped into the transmission exceeds the quantity of fluid being removed from the transmission by a predetermined amount, the controller will shut off the inlet pump, allowing the transmission pump to catch up so as not to overfill the transmission. Also, although the flow rates are generally matched by regulating the flow of fluid into and out of the transmission. If the inlet pump cannot keep pace with the flow of used fluid emitted from the transmission, the controller will close an outlet valve to momentarily stop the flow of used fluid to allow the quantity of new fluid supplied to catch up with the flow of used fluid removed.

In the preferred embodiment, pressure transducers in the inlet and outlet fluid receptacles detect the fluid level. Such pressure transducers are operative to produce electrical signals proportional to the fluid height to thus produce an accurate indication of the absolute quantity of fluid transferred, irrespective of any variations in viscosity or other characteristic of the transmission fluid being transferred into or out of the transmission.

During fluid transfer, the controller reads the hydrostatic pressure data and processes that data to establish a historical record. The hydrostatic pressure data from the new and used pressure transducers are processed by an analog to digital converter to convert analog signals into digital signals for data processing. The controller also includes a memory, storing fluid receptacle geometry and fluid density data. The program, upon receiving the new and used fluid digital pressure signals, retrieves the respective receptacle geometry and fluid density data from the memory and calculates an initial volume of fluid in each receptacle at the start of the transfer process. It then periodically calculates an instantaneous quantity in each receptacle throughout the transfer process. The initial quantity in each receptacle is stored in memory and the magnitude compared with the periodic instantaneous quantity calculations to determine the change in quantity of fluid in each receptacle throughout the process. When the decrease in absolute quantity of new fluid in the new fluid receptacle exceeds the increase in absolute quantity of the used fluid in the used fluid receptacle by a specified quantity, as for instance 0.10 gallons, the controller will shut the pump inlet off to momentarily stop the flow of new fluid. When the differential in quantity of new fluid pumped equals the differential in quantity of used fluid, the controller will reactivate the pump. Likewise, if the quantity of used fluid transferred exceeds the quantity of new fluid transferred by a certain amount, the controller will send a signal to close the used fluid valve to allow the quantity of new fluid transferred to catch up with the quantity of used fluid transferred.

In an alternate embodiment of the invention, the used fluid valve can be driven by a stepper motor to allow the valve to open and close incrementally to more closely regulate the rate at which used fluid is transferred. The controller will track the quantity of new fluid transferred and compare it to the transfer of the used fluid so that when the differential exceeds a predetermined quantity, the controller will close the used fluid valve a corresponding amount. In this way, the valve can restrict the flow of used fluid to allow the flow of fresh fluid to catch up, without completely shutting off the flow of used transmission fluid from the transmission.

Monitoring of the quantity of fluid transferred into and out of the transmission in this way can provide many advantages over monitoring flow rate. First, the device can virtually insure that the absolute quantity of fluid in the transmission will remain relatively constant throughout the process regardless of the many variables that might be introduced such as foaming of the fluid, variations in viscosity due to temperature change or the introduction of fluid having a viscosity different from that being removed. This provides safe transfer of fluid to insure against starving the transmission resulting in damage. Further, since the controller monitors the quantity of fluid in both the new and used receptacles at all times, the operator will be alerted of any shortage of new fluid in the new fluid receptacle or of insufficient volume in the used fluid receptacle before initiating the fluid exchange and will likewise be alerted when the desired quantity has been exchanged. Similarly, the controller can be programmed to deliver specific quantities of fluid tailored to a specific transmission before automatically terminating the exchange process. For example, if a specific transmission requires 12 quarts of transmission fluid, the operator can select this preprogrammed quantity at the start of the process. The changer will exchange exactly 12 quarts and then terminate the exchange.

Another alternate embodiment includes a fluid contamination sensor in the new fluid receptacle to alert the operator when the new fluid has been contaminated such as by water condensation. It is known to those skilled in the art that contamination of transmission fluid by water, metal or other substances will cause a decrease in dielectric constant in the fluid. Placing a dielectric sensor in the bottom of the tank, where such contamination will generally collect, can provide dielectric constant data which can be sent to the controller. By reading this data, the controller can alert the operator when the dielectric constant drops, indicating contamination of the fluid.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

Figure 1:
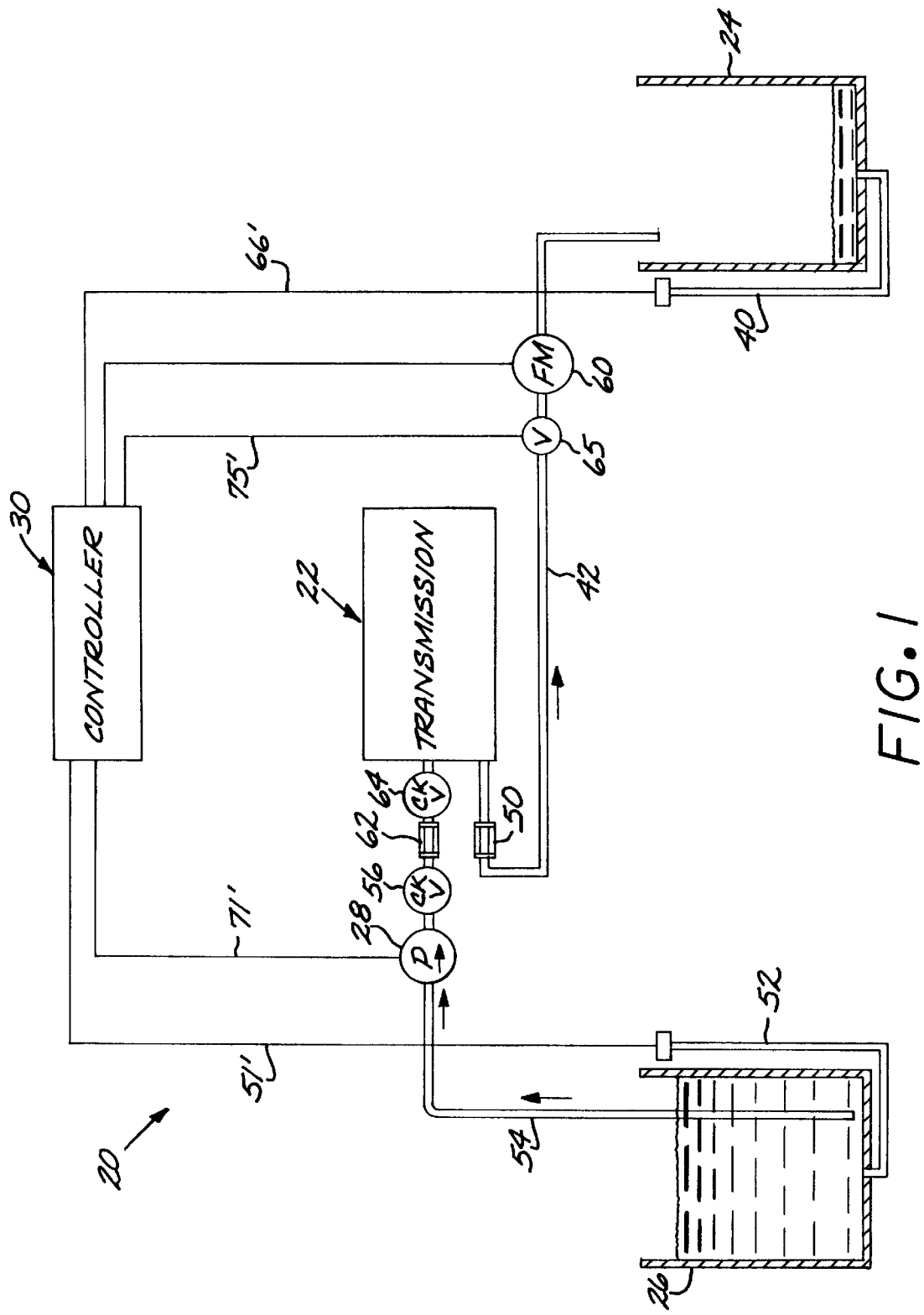
FIG. 1 is a schematic showing a fluid changer apparatus of the present invention connected to a transmission.

In the following detailed description, like reference numerals will be used to refer to like or corresponding elements in the different figures of the drawings. As shown in FIG. 1, for purposes of illustration, the invention is embodied in a fluid changer, generally designated 20, for changing substantially all of the fluid in an automatic transmission, generally designated 22. The fluid changer receives used transmission fluid from the transmission and collects the used fluid in a used fluid receptacle 24. Likewise, the changer stores new transmission fluid in a new fluid receptacle 26 and pressurizes such fluid as by a pump 28 to flow new fluid into the transmission as the used fluid is removed. A controller, generally designated 30, monitors the change in quantity of used fluid in the used fluid receptacle 24 based upon the head of fluid therein and regulates the flow of new fluid to maintain an equivalent change in quantity of new fluid in the new fluid receptacle, thereby maintaining a relatively constant supply of fluid in the transmission during the exchange.

Figure 2:
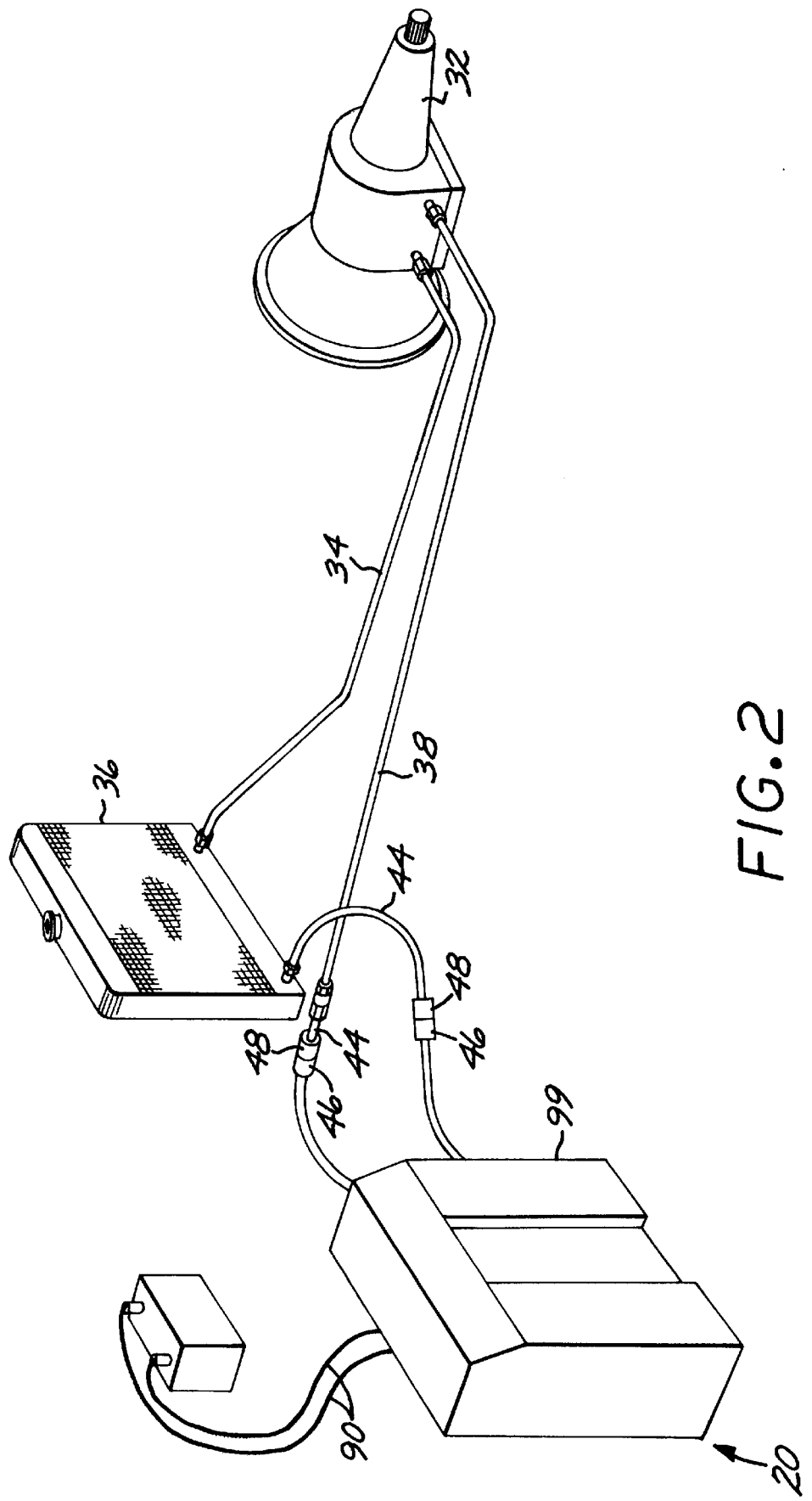
FIG. 2 is a schematic diagram showing the fluid changer depicted in FIG. 1 connected to a cooling system of an automobile.

With reference to FIGS. 1 and 2, the changer is intended for use with an automatic transmission and may be connected with an external cooling system so that an internal transmission pump 32 will pump transmission fluid from the transmission through an effluent conduit 34 (FIG. 2) to a heat exchanger 36 and back to the transmission through an influent conduit 38 (FIG. 2). By connecting into the cooling system, the used fluid is pumped out of the transmission by the transmission pump to collect in the used fluid receptacle 24 (FIG. 1). The pump 28 pumps new fluid from the new fluid receptacle into the transmission through an influent conduit 54 to maintain a constant supply throughout the exchange process.

With reference to FIG. 1, the used fluid receptacle 24 defines a fluid chamber of a predetermined geometrical configuration such that, for a given change in head of fluid therein, a corresponding volumetric change can be calculated. In the preferred embodiment the used fluid receptacle is cylindrical and includes a used fluid pressure transducer 40 disposed near the bottom thereof. The pressure transducer senses the hydrostatic pressure of the fluid in the used fluid tank and sends a corresponding electrical signal 66 through lead 66' to the controller 30.

With reference to FIGS. 1 and 2, a used fluid conduit 42 connects the used fluid receptacle 24 with the effluent transmission cooling conduit 34 via the heat exchanger. As will be appreciated by those skilled in the art, fluid communication between the used fluid conduit and the effluent transmission cooling line can be accomplished by many means. However, because automobile manufacturers provide transmission cooling conduits of various configurations, in the preferred embodiment, the used fluid conduit connects to various adapter couplers 44. In this regard, the used fluid conduit terminates at its first end in a female quick disconnect fitting 46 capable of connecting to a male quick disconnect fitting 48 provided in one end of the adapter coupler. The adapter couplers are configured at their other ends to attach to the ends of various commercially available influent transmission cooling conduits and heat exchangers 36.

With reference to FIG. 1, a used fluid sight glass 50 is provided in the used fluid conduit 42, disposed such that it is visible to the operator when the machine is in use. The sight glass is in the form of a glass or plexiglass tube of approximately the same diameter as the used fluid conduit and allows the operator to visually monitor the condition of the fluid exiting the transmission.

Figure 3:
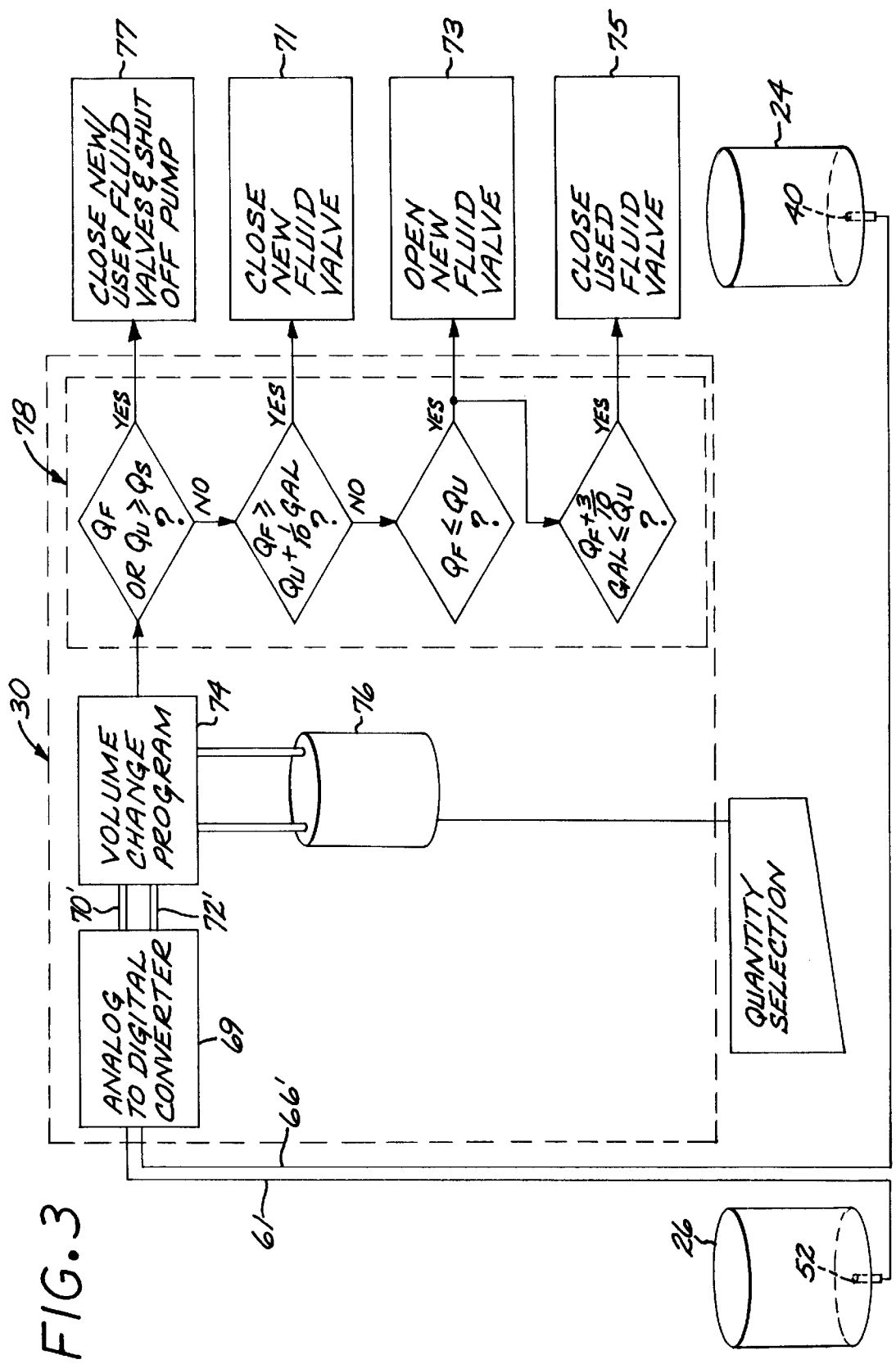
FIG. 3 is a schematic diagram of a controller included in the fluid changer shown in FIG. 1.

With continued reference to FIG. 1, as with the used fluid receptacle, the new fluid receptacle 26 is configured to define a fluid chamber of a predetermined configuration such that a given change in fluid head corresponds to a calculable volumetric change of fluid therein. In the preferred embodiment, the used fluid receptacle is cylindrical and of the same size and configuration as the used fluid receptacle. The new fluid receptacle is provided with a new fluid pressure transducer 52 disposed near the bottom of the new fluid receptacle, which senses the hydrostatic pressure of fluid in the new fluid receptacle and sends a corresponding signal 51 through lead 51' to the controller 30 (FIG. 3). The new fluid receptacle is connected with the transmission by a new fluid conduit 54 having at its first end a female quick disconnect fitting 46 (FIG. 2) for connection with the male quick disconnect fitting 48 provided at one end of an adapter coupler 44 (FIG. 2).

Referring again to FIG. 1, the pump 28 is connected in the new fluid conduit 54 and pumps new transmission fluid from the new fluid receptacle 26 to the transmission 22. A pump check valve 56, installed just downstream of the pump 28 in the new fluid conduit, prevents the loss of prime in the pump when the changer 20 is disconnected from the transmission 22. The controller 30 regulates the pump to maintain the correct flow of new transmission fluid. In the preferred embodiment, a flow meter 60 and a control valve 65 are included in the used fluid conduit 42 and are connected with the controller by respective leads 60' and 75'.

Referring to FIG. 3, a new fluid sight glass 62 is provided in the new fluid conduit 54 and may be mounted on the control panel to be visible to the operator when the changer 20 is in use. As with the used fluid sight glass 50, the new fluid sight glass is constructed of tubular glass or plexiglass and preferably has a length and diameter the same as that of the new fluid conduit. In practice, the new fluid sight glass is disposed parallel and in close proximity to the used fluid sight glass so that visual comparison of used fluid and new fluid can easily be performed. A new fluid check valve 64 is provided in the new fluid conduit 54 downstream of the sight glass to prevent used fluid from the transmission from back-flowing into and contaminating the new fluid.

With further reference to FIG. 1, the controller 30 is responsive to a control signal indicative of a selected condition such as total amount of new fluid added or the purity of the used transmission fluid being removed to generate a signal to deactivate the pump 28 and effect closure of the used fluid valve 65 to terminate the exchange process.

Figure 4:
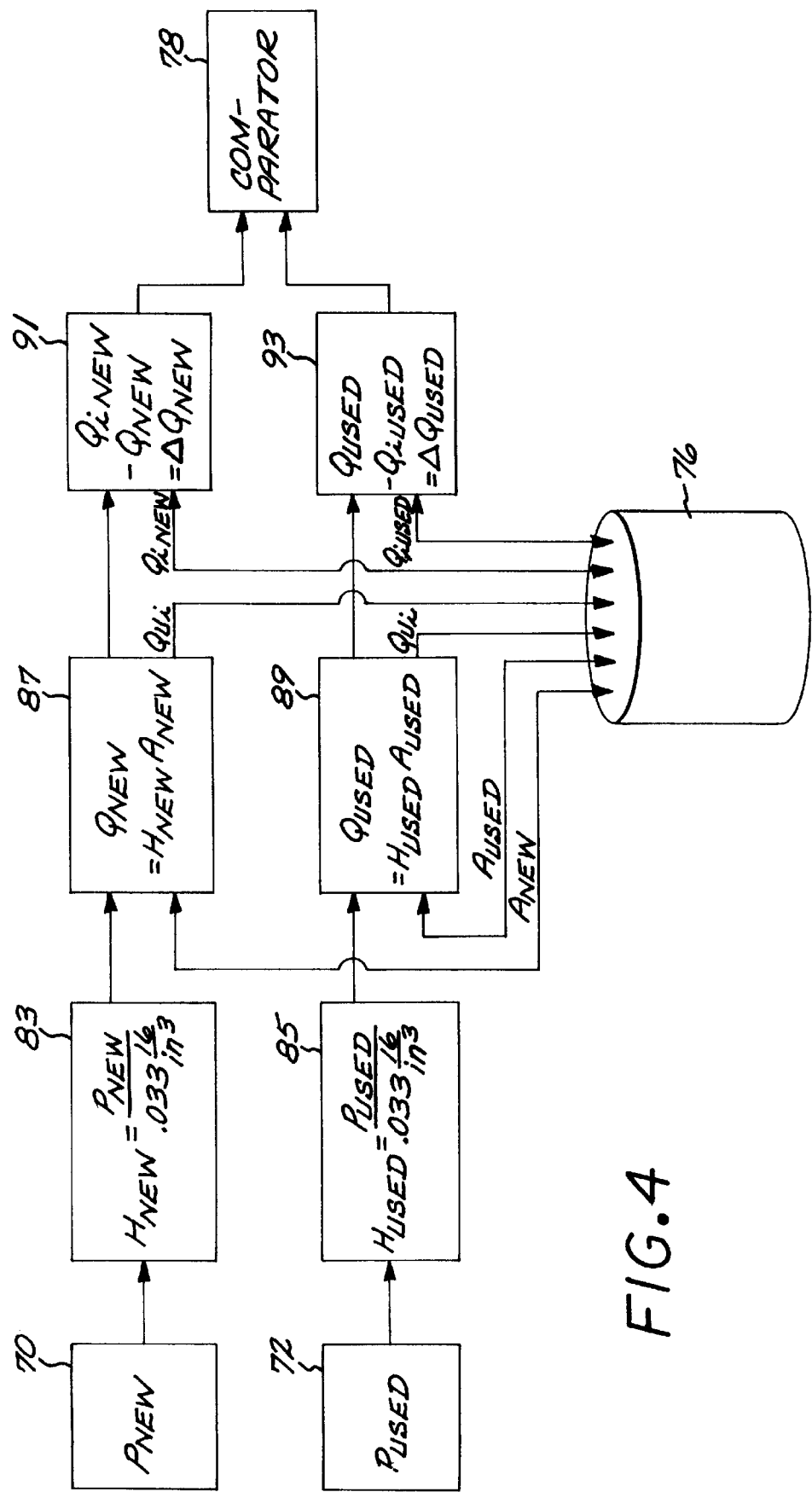
FIG. 4 is a schematic diagram showing the logic of a program for calculating fluid quantity in the changer apparatus shown in FIG. 1.

With reference to FIG. 3, the controller 30, in the form of an electronic processor, calculates the volumetric fluid in the new and used fluid receptacles 26 and 24 (FIG. 1), respectively, and regulates the flow of new fluid to maintain such flow equal to that of the used fluid. To this end, the new and used fluid signals generated by the respective transducers 52 and 40 are communicated through respective electrical leads 51' and 66' to a digital converter 69 to be converted into respective new and used fluid digital signals, communicated through respective leads 70' and 72' to a volume change programer 74, the logic of which is illustrated in FIG. 4.

With continued reference to FIG. 3, the processor also includes a memory 76, in the form of random access memory (RAM), for storing function parameters including new and used fluid receptacle geometry data, fluid density and fluid transfer quantity selection and for storing calculated fluid quantities for future retrieval. In the preferred embodiment, the new and used fluid geometry data, in the form of constant interior cross sectional area of the receptacles, are permanently input into the memory during manufacture. Similarly the density of the transmission fluid 0.033 lb/in$^3$ is stored in the memory. Transfer quantity as selected by the operator is input into the memory at initiation of the process.

Upon initiation of the fluid transfer, the program 74 of the controller 30 is operative to retrieve the new and used fluid receptacle geometries, as well as the fluid density, from the memory 76 and, based upon the digital new and used fluid pressure transducer signals as processed through the analog to digital converter 69, calculates the initial quantity of fluid in the new and used fluid receptacles. These initial quantities of new and used fluid are stored in the memory 76 for recall during the transfer process. As the transfer progresses, the program periodically reads digital hydrostatic new and used fluid pressure data from the analog to digital converter and calculates an instantaneous quantity of fluid in each receptacle in the same manner to produce respective quantity signals. The processor retrieves the initial new and used fluid quantity data and, by subtracting the signals indicative of instantaneous new fluid quantity from initial used fluid quantity and the initial used fluid quantity from the instantaneous used fluid quantity signal, calculates the quantity changes of new and used fluid to produce fluid differential signals.

A comparator 78 in the processor (FIG. 3) receives these new and used fluid quantity change signals calculated by program 74 and compares one with the other. When the volume of new fluid exchanged exceeds the quantity of used fluid exchanged by a selectable valve, typically ¹⁄₁₀ gallons or more, the comparator sends a signal 71 through lead 71' to deactivate the pump 28 (FIG. 1) to stop the flow of new fluid. When the new fluid quantity change is equal to or less than the used fluid quantity change the comparator will generate a signal 73 to be communicated through a lead 73' to activate the pump. In the event the transmission pump flows used fluid at such a rapid flow rate that the rate of accumulation in the used fluid receptacle exceeds the quantity change of new fluid by some predetermined amount such as ³⁄₁₀ gallons, the comparator will communicate a signal 75 through lead 75' to momentarily close the used fluid valve 65 to allow the cumulative flow of new fluid to catch up with the cumulative flow of used fluid.

With continued reference to FIG. 3, when either the new or used fluid quantity change equals or exceeds the selected transfer quantity, the comparator 78 will generate a signal 77 to be communicated through the leads 71' and 75' to turn off the pump 28 (FIG. 1) and close the used fluid valve 65 to terminate the transfer process. It will be appreciated that, for the embodiment shown, the new and used receptacles are of the same size and configuration so that the differential in fluid height sensed by the transducers will produce a direct indication of the cumulative difference in weight of fluid, thus eliminating the necessity of storing specific data on the size and configuration of each.

However, in the installations where the configurations of the receptacles are different or the configuration of one or the other is irregular, it will be necessary for the controller to respond to the fluid height sensed to calculate the weight of fluid in the receptacle. To this end, the program is selective to calculate the quantity of used and new fluid at any given time by receiving the new and used fluid hydrostatic pressure data 70 and 72 (FIG. 4, respectively, from the analog to the digital converter 69 (FIG. 3) and dividing this value by the density constant of transmission fluid, 0.033 lb/in$^3$, retrieved from the memory 76 (FIG. 4). Since the pressure transducers 40 and 52 (FIG. 1) are located in the bottom of the new and used fluid receptacles 26 and 24, respectively, dividing the measured pressure by the density of the transmission fluid will determine the total heights of new and used fluid 83 and 85 in the respective receptacles. The program will then retrieve the formula for the relationship between height in the respective receptacle and the cross sectional area of the respective receptacles from the memory and multiply this value by the height of the fluid, thereby producing signals 87 and 89 accurately reflecting the quantities of fluid in the respective new and used fluid receptacles 26 and 24. The program will then subtract the data for the instantaneous new fluid quantity from that for the respective initial new fluid quantity and the initial used fluid quantity from the instantaneous used fluid quantity to generate indicative quantity signals 91 and 93 to be communicated to the comparator 78 (FIG. 1).

Figure 5:
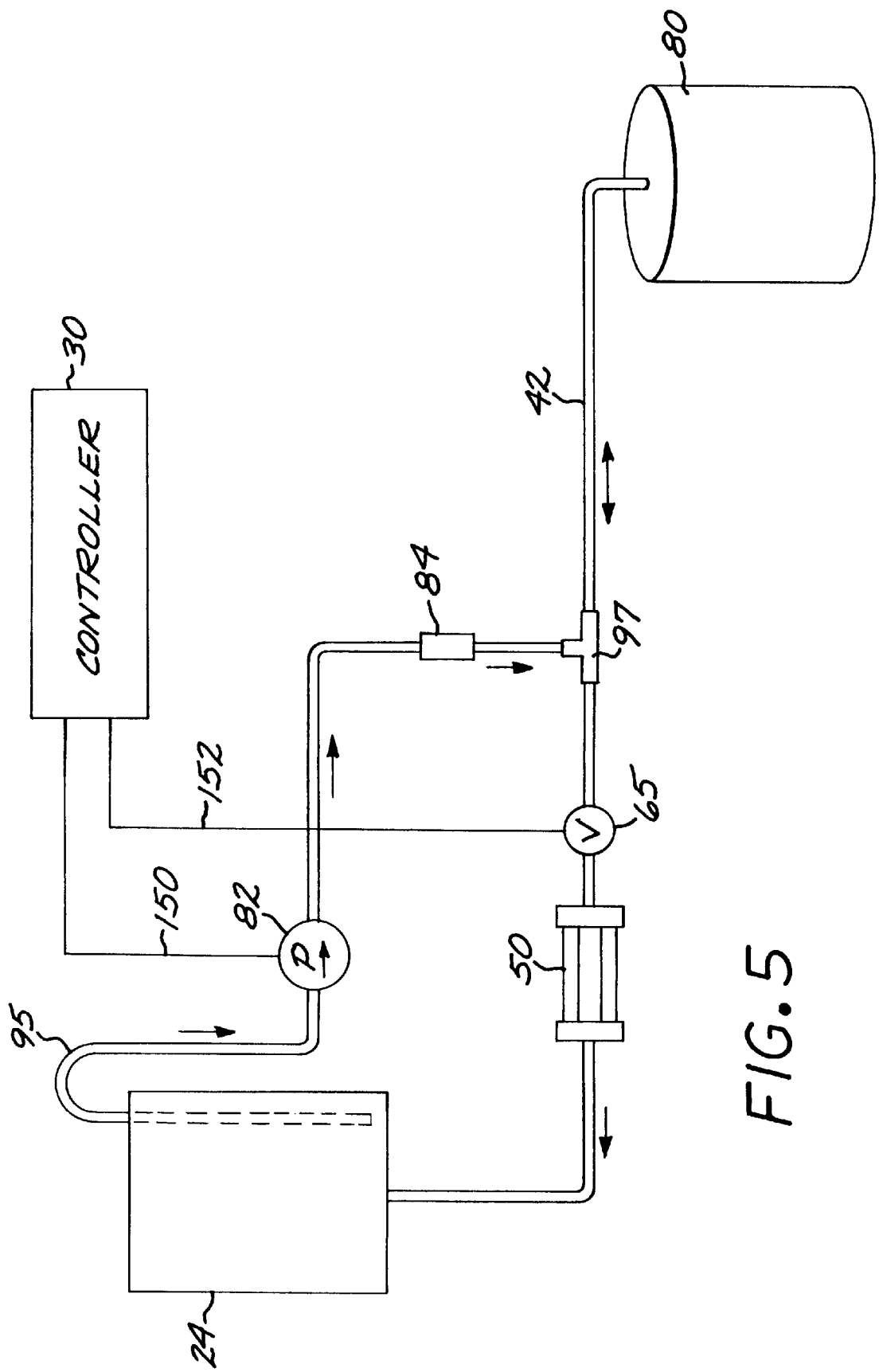
FIG. 5 is a schematic diagram of a second embodiment of the fluid changer of the present invention.

With reference to FIG. 5, the preferred embodiment of the changer 20 includes a system for pumping the contents of the used fluid receptacle 24 backwards through the used fluid line 42 to an external waste collection container 80. The system includes a drain line 95 leading from the used fluid receptacle 24 through a waste pump 82 and check valve 84 to the line 42. It will be appreciated that, to start an exchange, the end of the line 42 is removed from the container 80 (FIG. 5) and connected with the transmission. Then the controller is activated to communicate control signals through leads 150 and 152 to the pump 82 and valve 65 to maintain such pump deactivated and the valve 65 open to allow used fluid to be pumped from the transmission pump 22 to flow to the left through the used fluid conduit 42, as viewed in FIG. 5 and through the used fluid valve 65 to the used fluid receptacle 24. In this mode, the waste system check valve prevents the used fluid from flowing through the waste pump. After the exchange has been completed the controller 30 will close the used fluid valve to prevent the used fluid from flowing back out of the used fluid receptacle when the changer is disconnected from the transmission 22 (FIG. 1).

After the exchange is complete and the changer 20 has been disconnected from the transmission 22, the used fluid receptacle 24 may be drained by introducing the free end of the used fluid conduit 42 into any desired waste fluid collection container such as container 80. Pressing the drain button 86 on a control panel 88 (FIG. 6) will communicate a signal through the lead 150 to activate the waste pump 82 to pump the used fluid out of the receptacle 24 through the drain line 95 and check valve 84 and through a "T" fitting 97 to the used fluid conduit 42 for transport to the waste fluid collection container. The used fluid valve 65, which remains closed throughout the waste drain operation, prevents the used fluid from flowing back into the used fluid receptacle.

Figure 7:
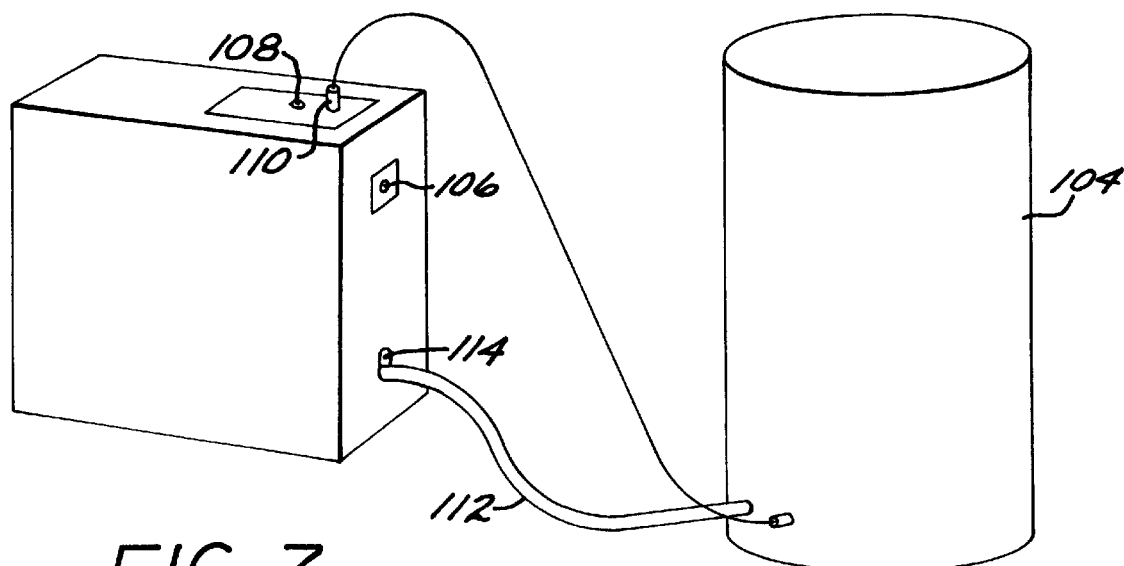
FIG. 7 is a schematic diagram of a third embodiment of the changer of the present invention.

With reference to FIG. 1, the hydraulic components, such as the receptacles, pumps, valves, conduits, flow meters and pressure transducers, are housed in a cabinet 99 (FIG. 2) which can be constructed from formed sheet metal or can be formed of plastic by Rotational Casting or Reaction Injection Molding (RIM). Rotational casting consists of placing plastic in the form of powder or pellets into a mold and spinning the mold while applying heat. We have found rotational casting to produce a high quality cabinet at a relatively low cost. The new and used fluid receptacles can likewise be conveniently constructed of plastic by rotational casting. The control panel 88, constructed from a flat rectangular sheet of metal, includes control switches, lights and LED or LCD displays, all of which are also commercially available items. These switches, lights and displays are connected in circuit with the processor as illustrated in FIG. 7.

In operation, the user will first disconnect the effluent transmission fluid conduit 34 from the heat exchanger 36 of the transmission to be serviced and then select the appropriate adapter couplers 44 to mate with the influent transmission conduit 38 and heat exchanger 36. The operator will then disconnect the influent transmission fluid conduit from the heat exchanger and connect the appropriate adapter coupler to the influent transmission conduit and the quick disconnect fitting of the adapter coupler to the quick disconnect 46 of the used fluid conduit. Similarly the operator will then connect the other selected adapter coupler to the heat exchanger and the quick disconnect fitting of the adapter to the quick disconnect fitting of the new fluid conduit. A pair of electrical leads 90 (FIG. 2) may be connected with the automobile battery to provide power to operate the pumps, valves and controller. The operator will then start the engine of the automobile being serviced to activate the transmission pump.

Figure 6:
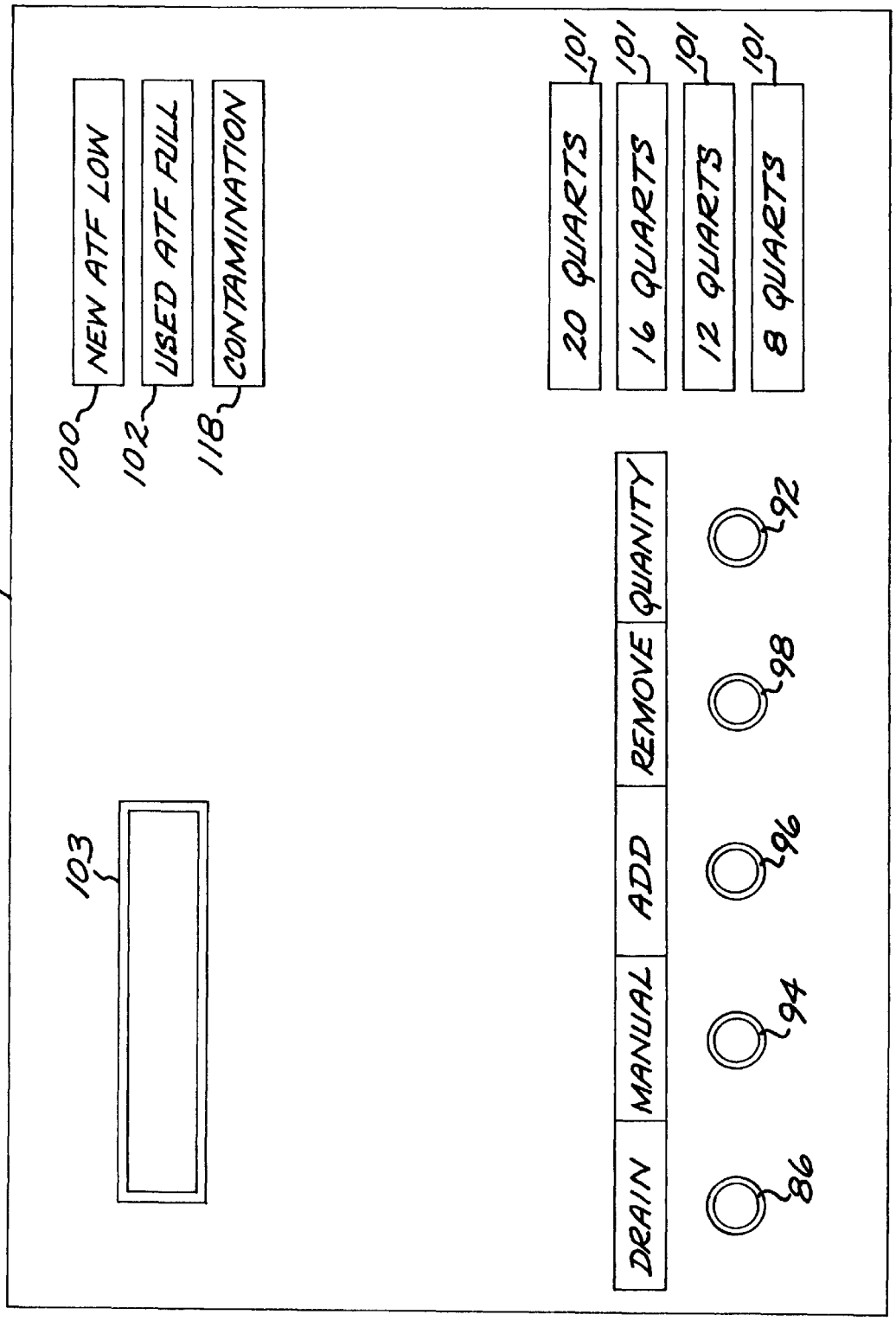
FIG. 6 is a plan view showing of a control panel included in the fluid changer shown in FIG. 1.

With reference to FIG. 6, once the changer 20 has been connected to the vehicle to be serviced, the operator may select the fluid quantity appropriate for the transmission being serviced. The control panel 88 (FIG. 6) includes a digital set switch in the form of a button 92 for selecting one of several preset quantities. Each time the button is pushed the controller will scroll sequentially through a series of the preselected quantities, indicated by a set of quantity selection lights 101 provided in the control panel. If no quantity is selected, the controller will select a default quantity of 16 quarts. If the desired quantity of fluid is not one of the preset quantities, the operator can press and hold a "manual" button 94 to actuate the new fluid pump 28 until the desired amount of fluid has been transferred. Releasing the "manual" button will cause the transfer to stop. An "add" button 96 and a "remove" button 98 are also provided on the control panel. If upon initial hook up for fluid transfer the transmission is detected as containing an incorrect amount of fluid, the operator may add or remove transmission fluid from the transmission in 0.5 quart increments by pressing the "add" or "remove" button, respectively. Pressing the "add" button will cause the controller to momentarily activate the pump 28 (FIG. 1) while keeping the used fluid valve 65 closed. Conversely, pressing the "remove" button will cause the controller to open the used fluid valve momentarily, allowing fluid to flow from the transmission, while the pump 28 remains inactive.

It will be appreciated by those skilled in the art that the pump 28 acts to control the quantity of used fluid introduced. The term control as used here in connection with controlling such fluid is intended to mean any acceptable way for controlling incoming flow at a rate dictated by the quantity of used fluid collected in the receptacle 24, such as by an electric pump 28, or pressurized supply tank with an electrical control valve, stepper valve or the like for controlling the rate at which new fluid is introduced.

With reference to FIG. 6, the controller 30 is programmed to continually monitor the quantity of fluid in the new and used fluid receptacles 26 and 24 (FIG. 1), respectively, to provide important information to the operator. For example, before initiating transfer, the operator may select the appropriate quantity of fluid to be transferred and, in the event there is either insufficient new fluid in the new fluid receptacle or insufficient available capacity in the used fluid receptacle for the selected transfer quantity, the controller will generate an alarm signal to activate a selected light 100 or 102 on the control panel to read a"New ATF Low" or "Used ATF Full" light 102 as the case may be. Alternatively, the alarm could be in the form of an audible alarm used in lieu of or in addition to the "New ATF Low" light or "Used ATF Full" light. Furthermore, the controller is operative to send a quantity signal to a flow tally indicator 103 in the form of an LED or an LCD display mounted on the control panel 88 to progressively display the quantity of fluid transferred. The controller also alerts the operator by means of an audible alarm when fluid flow has been prematurely interrupted.

With reference to FIG. 7, in an alternate embodiment of the invention, the controller is programmed to calculate fluid quantity change for various receptacle geometries. While the preferred embodiment of the invention employs new and used fluid receptacles 26 & 24 (FIG. 1) which are integral with the changer 20 and have constant interior cross sections, the use of a programmable controller capable of use with various receptacle geometries provides the flexibility of use with an external bulk transmission fluid storage tank 104 of the type commonly used in auto repair shops. Such a tank can have any geometric configuration so long as the relationship of interior cross section to height within the tank is known. It will be appreciated by those skilled in the art that either the used or new fluid receptacle could be in the form of an external bulk tank. When an external bulk storage tank is to be used as a new or used fluid receptacle, the tank must be provided with a new or used fluid pressure transducer 52 or 40, preferably disposed near the bottom of the tank.

With continued reference to FIG. 7, the formula for the geometry of the external tank 104 must be programmed and then input into the controller 30 to cause the controller to calculate the volume change for a given rise in head as indicated by sensed changes of pressure in the tank. This geometric data is input through a program port 106 as a function of cross sectional area for a given height within the tank, downloaded from a personal computer, not shown. Once input, the geometric data will remain in memory 76 for use in subsequent fluid transfer operations so long as the same external bulk storage tank is used. Signals from the pressure transducers are fed to the controller through respective used fluid and new fluid pressure input ports 108 and 110. Fluid from the bulk fluid receptacle is conducted to the changers through a bulk fluid conduit 112. To use the changer in this configuration, the operator must first disconnect the new fluid conduit 54 from the internal new fluid receptacle 26 (FIG. 1). The new fluid conduit can then be connected to the bulk fluid conduit which can be fed into the changer through bulk fluid opening 114 (FIG. 4).

The quantity of fluid in a receptacle can be determined for any given height of fluid therein so long as the geometric configuration of the receptacle is known. If the cross sectional area of the receptacle is known and is constant throughout the height of the receptacle, as in the preferred embodiment, calculation of the volume is relatively simple. In that case the quantity is equal to the cross sectional area times the height of the fluid. However, a quantity of fluid for a container of any known configuration is calculated as $_o\int^H A(x)dx$, where $A(x)$ is the function defining the cross sectional area of the container for a given distance x from the bottom of the container and H is the height of fluid therein. Similarly, a quantity change of fluid in the container can be calculated as $_o\int^H A(x)dx$, where H1 and H2 are two values of height of fluid. The height of fluid from a given point in a container can be determined by dividing the hydrostatic pressure by the density of the fluid, as earlier described in the preferred embodiment.

With reference to FIG. 1, in another embodiment, a stepper motor, not shown, drives the used fluid valve 65 allowing the valve to open and close incrementally to restrict the flow of used fluid without completely stopping the flow of fluid from the transmission. The controller 30, upon determining that the quantity change of used fluid exceeds the quantity change of new fluid by a selectable value, typically ³⁄₁₀ gallons or more, will send a signal to the stepper motor to close the valve one increment. When the quantity changes of used and fresh fluid are again equal, the controller will open the used fluid valve one increment. In this way, the used fluid valve can restrict the flow of used fluid from the transmission to allow the flow of fresh fluid to catch up, while still allowing flow of fluid through the transmission.

Figure 8:
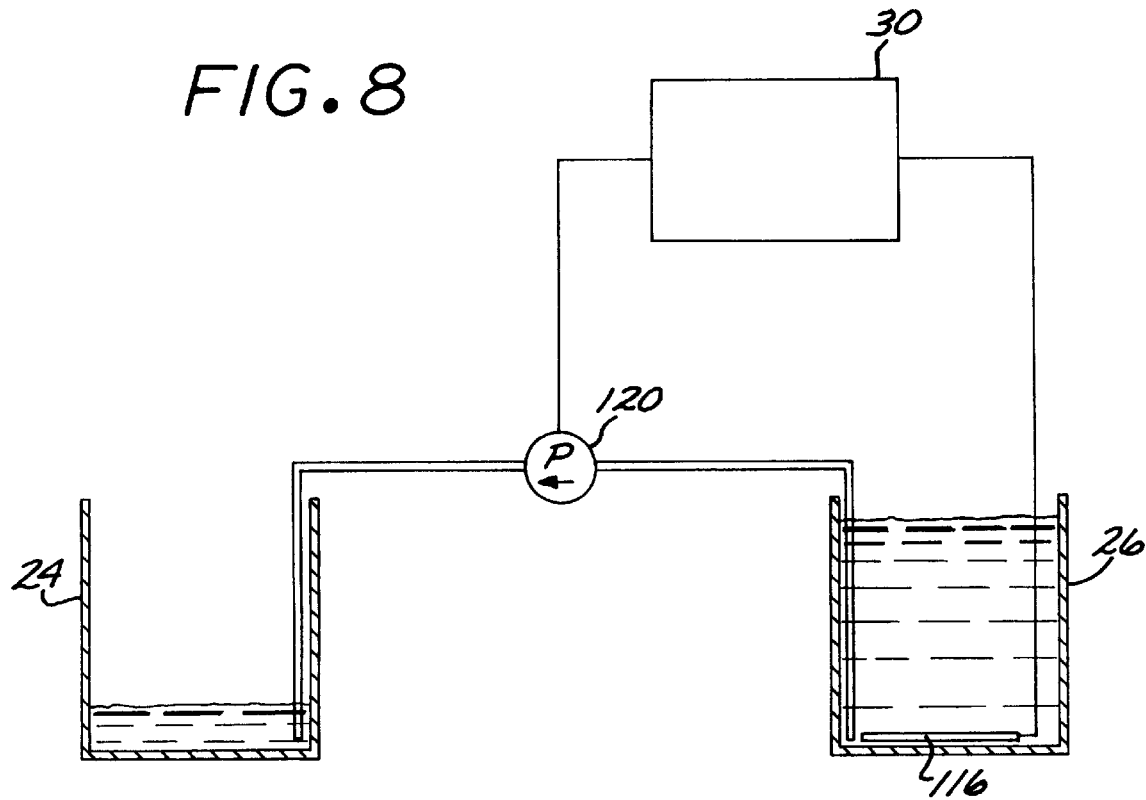
FIG. 8 is a schematic diagram of a third embodiment of the fluid changer of the present invention.

With reference to FIG. 8, another embodiment of the invention includes a dielectric contamination sensor 116 provided within the new fluid receptacle 26 to detect possible contamination of the new fluid contained therein. We have discovered that degradation of transmission fluid by contamination, such as from water condensation, will cause a measurable decrease in the dielectric constant of the fluid in the container. Most such contamination collects at the bottom of the receptacle where it would be more likely to flow into the new fluid conduit to be pumped to the transmission. By placing a dielectric sensor horizontally in the bottom of the new fluid receptacle, this decrease in dielectric constant can be detected and a corresponding signal sent to the controller 30. Upon detecting a predetermined magnitude of decrease in dielectric constant, the controller will generate a signal to activate a fluid contamination warning light 118 (FIG. 6) to alert the operator to the contamination condition.

With continued reference to FIG. 8, once alerted to the contamination condition, the operator can press a contamination evacuation button, not shown, activating a contamination evacuation pump 120 which pumps fluid from the bottom of the new fluid receptacle to the used fluid receptacle until the contamination has been removed from the new fluid receptacle. Once the contamination has been purged from the new fluid receptacle, the transmission fluid transfer process may resume.

Figure 9:
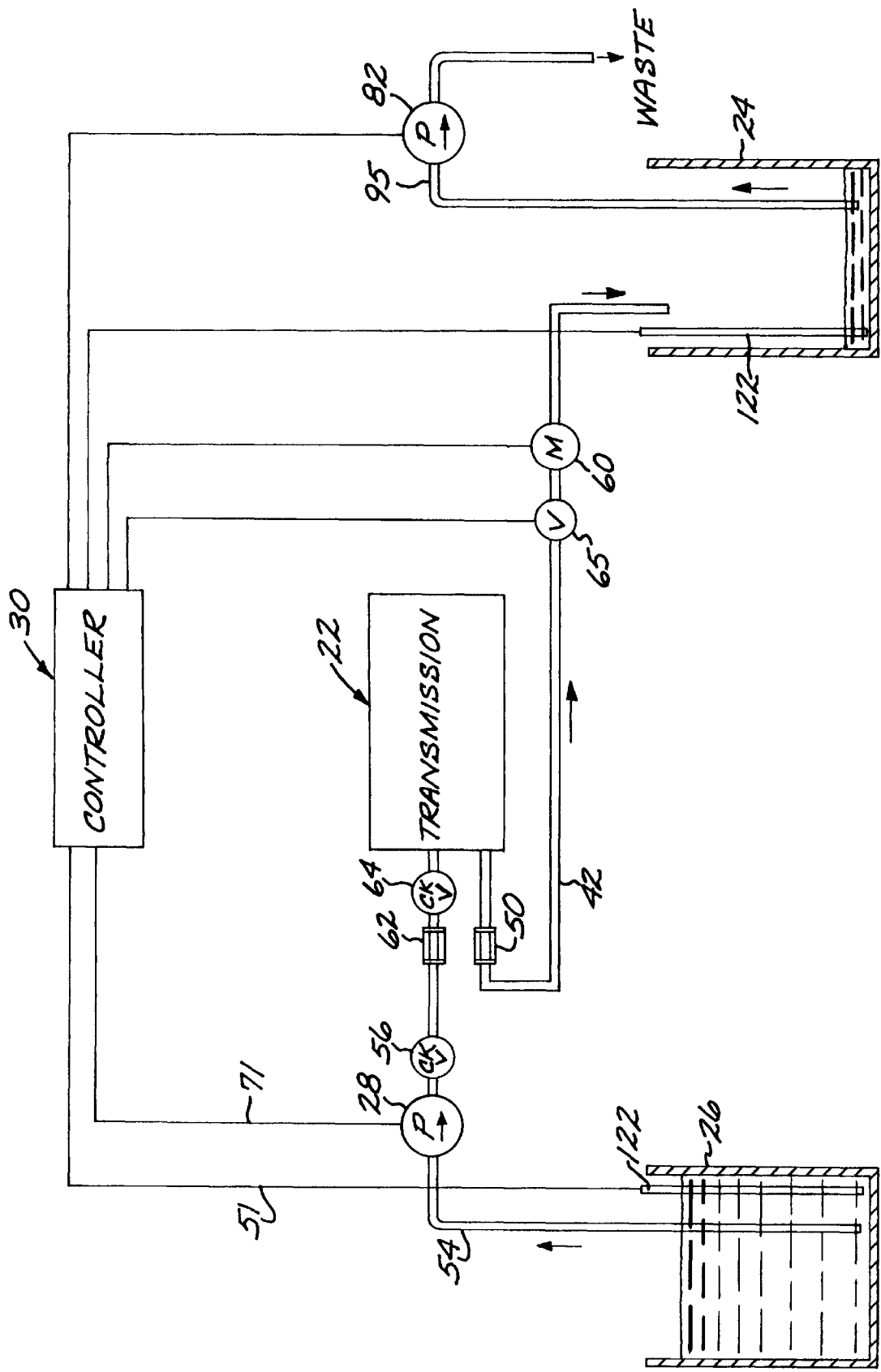
FIG. 9 is a schematic diagram of a fourth embodiment of the fluid changer of the present invention.

In yet another embodiment, as referred to in FIG. 9, a height sensor may be incorporated to detect the height of fluid in the new and used fluid receptacles. For example, a dielectric fluid level sensor 122 installed vertically in each of the used and new fluid receptacles 24 and 26, respectively, can provide the fluid height data to the controller 30 for monitoring the quantity change of new and used fluid. As will be appreciated by those skilled in the art, a dielectric sensor will detect a changing dielectric constant proportional to the amount of sensor in contact with the fluid. Other examples include the use of ultrasound or an infrared sensor to determine the height of fluid in the receptacles. By reading this data, the controller can determine the change in volume of the fluid and thereby determine the relative quantity changes of new and used fluids as disclosed in the preferred embodiment. While a dielectric sensor could provide the necessary height data, such a sensor has not been used in the preferred embodiment because of its relatively higher cost as compared with a pressure transducer.

From the forgoing, it will be appreciated that the transmission fluid changer of the present invention provides a simple, convenient and accurate means of changing transmission fluid in an automatic transmission. By monitoring the volume of new and used fluid transferred, the device can accurately match the quantity of new fluid exchanged to that of used fluid, independent of the viscosity of or presence of air in the new or used fluid. Also, by regulating the flow of new fluid to match the volumes of new and used fluid exchanged, relatively few moving parts are required, providing a machine which is quiet and reliable. The use of pressure transducers to determine the head of fluid in the new and used fluid receptacles further decreases the number of moving parts required, providing an economical and reliable means of measuring the quantity of the fluid.

While several particular forms of the invention have been illustrated and described, it will also be apparent that various modifications can be made without departing from the spirit and scope of the invention. By way of example, although several sensors have been disclosed for determining the height of fluid in the new and used fluid receptacles, it will be apparent to those skilled in the art that various other means could be employed as well to measure the height of the fluid.

What is claimed is:

1. A transmission fluid changer for connection to the fluid system of an automatic transmission to transfer new fluid thereinto while removing used fluid and comprising:

a used fluid receptacle formed with an upstanding used fluid chamber of a predetermined configuration;

a fluid sensor in the bottom of said receptacle for sensing the depth of said used transmission fluid in said chamber and responsive to said depth to generate a corresponding used fluid electrical signal;

a used fluid conduit for connection between a downstream location in said transmission and said receptacle to flow used fluid to said receptacle;

a controller connected with said sensor and programmed to respond to said electrical signal to generate a control signal proportional to said electrical signal;

a new fluid conduit for connection to an upstream location in said transmission; and an electric control in said new fluid conduit responsive to said signal to control the rate at which new fluid is pumped thereinto.

2. A transmission fluid changer as set forth in claim 1, wherein:

said electric control is a pump in said new fluid conduit, responsive to said control signal for controlling the flow rate of said new fluid to said transmission.

3. A transmission fluid changer as set forth in claim 2, further comprising:

a flow meter in said new fluid conduit responsive to the flow of fluid therein to generate an electrical signal proportional to the quantity of fluid flowed therethrough and wherein said controller includes a flow indicator responsive to said electrical flow signal.

4. A transmission fluid changer as set forth in claim 3, wherein:

said flow indicator is a tally indicator to indicate the total quantity of new fluid flowed.

5. A transmission fluid changer as set forth in claim 4, wherein:
said tally indicator includes a recorder for recording the cumulative fluid flow.

6. A transmission fluid changer as set forth in claim 3, further comprising:
a set switch operative to be set to multiple predetermined quantities to generate respective set signals; and
said comparator is responsive to respective first and second selected relationships relative to the respective first and second said new fluid capacity signals to shut off said pump.

7. A transmission fluid changer as set forth in claim 6, further comprising:
an alarm, and wherein:
said controller is responsive to respective first and second selected relationships relative to the respective first and second said new fluid capacity signals to activate said alarm when fresh or used fluid has been prematurely interrupted.

8. A transmission fluid changer as set forth in claim 1, wherein:
said sensor is in the form of a pressure transducer for sensing the change in static pressure within the chamber.

9. A transmission fluid changer as set forth in claim 1, wherein:
said sensor is in the form of a dielectric sensor projecting upwardly in said chamber.

10. A transmission fluid changer as set forth in claim 1, further comprising:
a new fluid receptacle;
a new fluid sensor in said new fluid receptacle for sensing the quantity of fluid removed from said new fluid receptacle and responsive to such quantity to generate a new fluid signal proportional to said quantity, and wherein:
said controller is connected with said new fluid sensor and includes a comparator responsive to a predetermined differential between said signals to produce a shut off signal.

11. A transmission fluid changer as set forth in claim 10, further comprising:
an alarm, and wherein:
said controller is operative in response to said new fluid electrical signal exceeding a predetermined value to activate said alarm indicating insufficient available new fluid.

12. A transmission fluid changer as set forth in claim 10, that includes:
a cabinet mounting said receptacles and said controller, and wherein:
said changer includes a fluid circuit including said used fluid conduit incorporating a drain line, a T-fitting having a leg connected with said valve and to said receptacle, a second leg connected with said drain line and a third leg for connection with the transmission, said changer further including a drain pump in said drain line.

13. A transmission fluid changer as set forth in claim 1, wherein:
said sensor is an infrared sensor for sensing the height of fluid in said chamber.

14. A transmission fluid changer as set forth in claim 1, wherein:
said sensor is an ultrasound sensor for sensing the height of fluid in said chamber.

15. A transmission fluid changer as set forth in claim 1, that includes:
a check valve in said new fluid conduit for blocking flow to said receptacle.

16. A transmission fluid changer as set forth in claim 1, that includes:
a new fluid receptacle for receiving new fluid and for connection with said transmission to add fluid thereto;
a sensor for sensing the quantity of fluid in said new fluid receptacle and operative to generate a new fluid electrical signal corresponding with the quantity therein; and
said controller includes a new fluid set switch operative upon manipulation to a selected transmission quantity position to generate a set signal and a comparator for comparing the relationship of such new fluid electrical signal with such set signal and to, when such set signal indicates a selected quantity greater than that indicated by such new fluid electrical signal, generate an alarm signal.

17. A transmission fluid changer as set forth in claim 1, further comprising:
an alarm, and wherein:
said controller is operative in response to said used fluid electrical signal exceeding a predetermined value to activate said alarm indicating insufficient available capacity in said receptacle.

18. A transmission fluid changer as set forth in claim 17, wherein:
said alarm is audible.

19. A method of changing fluid in an automatic transmission, including the steps of:
selecting a used fluid receptacle formed with a receiving chamber having a predetermined volume and height relationship;
selecting a sensor for sensing said height to produce a corresponding electrical signal;
selecting a programmable controller;
programming said controller with said relationships and to respond to said used fluid electrical signal to produce a used fluid control signal corresponding with said electrical signal; and
selecting a pump responsive to said control signal for controlling flow of used fluid flowed through a used fluid conduit from said transmission.

20. A method of changing fluid in an automatic transmission of claim 19, that includes:
selecting said sensor as a pressure sensor to sense the column of used fluid within said used fluid receptacle.

21. A method of changing fluid in an automatic transmission of claim 19, that includes the steps of:
selecting a new fluid receptacle including a pressure sensor responsive to the differential in static head in said new fluid receptacle to generate a corresponding used fluid electrical signal;
selecting such controller to include a comparator for comparing said new and used fluid control signals and responsive to a predetermined magnitude of differential to generate a shut off signal; and
selecting said pump to be responsive to said shut-off signal to deactivate.

22. A transmission fluid exchanger for use with an automatic transmission having a fluid circuit including an upstream component and a downstream component, said exchanger comprising:

a used fluid conduit for connection with said upstream component of said transmission for receiving used fluid pumped out of such transmission;

a used fluid receptacle for receiving used fluid from such conduit;

a pressure sensor in the bottom of said receptacle responsive to the rate of change of the column of said fluid in said receptacle to produce an analog fluid evaluation rate signal;

a new fluid conduit for connection with said downstream component of said transmission for introducing new fluid;

an electric pump for controlling the rate of new fluid flow through said new fluid conduit; and a processor coupled with said control valve including a converter for converting said evacuation rate signal to an evacuation rate digital signal, said processor being responsive to control said pump to control the rate of fluid flow in said new fluid conduit in response to the rate of change of fluid in said used fluid receptacle.

23. A transmission fluid exchanger as set forth in claim 22 that includes:

an electric used fluid control valve for controlling fluid flow in said used fluid conduit and responsive to a limit signal to reduce the rate of flow in said used fluid conduit, and wherein:

said processor is coupled with said used fluid control valve and is responsive to a predetermined magnitude of said evacuation rate digital signal to generate said limit signal.

24. A transmission fluid exchanger as set forth in claim 23, further comprising:

a stepper motor operating said control valve, wherein said stepper motor opens and closes said control valve incrementally in response to said limit signal.

25. A transmission fluid exchanger as set forth in claim 23, that includes:

a new fluid differential sensor for sensing the rate of new fluid flow in said new fluid conduit and responsive to generate an analog new fluid flow rate signal, wherein:

said converter is responsive to said analog new fluid flow rate signal to generate a new fluid flow rate digital signal; and said processor includes a comparator for comparing said evacuation flow rate digital signal with said new fluid flow rate digital signal and responsive to a selected differential to generate said limit signal.

26. A transmission fluid exchanger as set forth in claim 25, that includes:

a new fluid receptacle connected with said new fluid conduit; and said new fluid differential sensor is in the form of a pressure sensor in said new fluid receptacle.

27. A transmission fluid exchanger as set forth in claim 26, wherein:

said used fluid and new fluid receptacles are of the same internal geometrical configuration.

28. A transmission fluid exchanger as set forth in claim 22, wherein:

said processor includes a memory and a program of the geometrical configuration of said receptacle, said processor being further responsive to said program to control said valve.

29. A transmission fluid exchanger as set forth in claim 22, wherein:

said processor is programmable with an algorithm defining the geometrical configuration of said receptacle.

* * * * *